Dec. 27, 1932.  F. A. FAUST  1,892,047
TEMPERATURE REGULATING SYSTEM
Filed Jan. 28, 1932  2 Sheets-Sheet 1

INVENTOR
FRED A. FAUST
BY
ATTORNEY

Dec. 27, 1932.   F. A. FAUST   1,892,047
TEMPERATURE REGULATING SYSTEM
Filed Jan. 28, 1932   2 Sheets-Sheet 2

INVENTOR
FRED A. FAUST
BY
ATTORNEY

Patented Dec. 27, 1932

1,892,047

UNITED STATES PATENT OFFICE

FRED A. FAUST, OF NAUGATUCK, CONNECTICUT, ASSIGNOR TO THE BRISTOL COMPANY, OF WATERBURY, CONNECTICUT, A CORPORATION OF CONNECTICUT

TEMPERATURE REGULATING SYSTEM

Application filed January 28, 1932. Serial No. 589,408.

The invention relates to the regulation of temperatures in heat-exchange apparatus, more particularly to apparatus adapted for the heating continuously to a predetermined outlet temperature of a liquid medium, for example apparatus adapted to the pasteurization of milk.

In a prior U. S. Patent, #1,750,001, apparatus of this nature is disclosed and wherein the regulation is effected by locating one of a pair of thermo-sensitive elements substantially at the inlet to a liquid conduit for conveying a heating liquid, and the other at a point in the conduit for the medium, such as milk, to be heated which is removed from the outlet of said conduit. The latter thermosensitive means is utilized as a detector of the heat requirements and is adapted to select automatically a setting, or effect a displacement, of the control points of a contact device operated by the other thermo-sensitive element. This contact device serves to regulate, in turn, the temperature of the heating liquid in accordance with the temperature requirements of the medium to be heated by controlling the admission of a heating medium to the heating liquid therefor.

In an arrangement of this nature, with the one bulb in the milk, it will be appreciated that such location cannot be permanent, as a matter of fact it is necessary at least daily to remove the same from the heat-exchange apparatus, which materially shortens the life of the said element. Furthermore, when one of the bulbs is located in the milk as it passes through the heat-exchange apparatus, no control thereby is effected until the milk actually flows past said thermosensitive element. In starting operations, therefore, it is necessary to manually adjust and set various apparatus and determine by trial the proper setting for the control apparatus as influenced by the thermo-sensitive element which is subjected to the temperature of the milk.

The present invention has for a general object a fully automatic control under all conditions and to obviate the necessity for such preliminary adjustments and trials, as in the provision of a control system wherein both of the thermo-sensitive elements may be permanently located in the heating liquid—the one effecting a primary control and being located substantially at the inlet point to the heat-exchange apparatus, while the other is located at a point appreciably removed therefrom and which may be substantially the outlet point of the heating liquid from said heat-exchange apparatus, while the other is located at a point appreciably removed therefrom and which may be substantially the outlet point of the heating liquid from said heat-exchange apparatus, or an intermediate point.

By this expedient, a primary control from the entering liquid is had, which is particularly desirable because the time lag is at a minimum, and a further control is had through the second thermo-sensitive element located at a point removed therefrom and adapted to influence or change the control conditions of the controlling member influenced by the other of the said thermo-sensitive elements. Furthermore, there is then no tendency for the heating liquid to attain an excessive temperature, and particularly when no milk is flowing, since the second thermo-sensitive element being also in the water will effect a setting action on the primary control device and therefore hold the same at a temperature not appreciably in excess of that to which the medium is to be heated.

A further object of the invention resides in the provision of a system, for maintaining the predetermined temperature of the milk or other liquid, embodying control means which are independently influenced by the respective thermo-sensitive elements rather than operating under a "dual" control.

A still further object of the invention contemplates, in the independently influenced system, an adjustment automatically of one of the control points and in accordance with load variations.

In carrying out the invention, two thermo-sensitive elements are adapted to respond respectively to the varying temperatures at different portions of the heating liquid, in which both are arranged to be located, and to influence jointly, or independently, suitable control apparatus either of the electrical or pneumatic type for regulating the admission of a heating medium to the heating liquid in accordance with the temperature requirements of the milk or liquid medium to be maintained at a constant predetermined outflow temperature. With a fixed rate of circulation of the heating liquid, the temperature of the same will have to vary with the heat requirements of the milk whose temperature is to be maintained constant under variations in rate of flow through the heat-exchange device and in the actual temperature at entry.

The nature of the invention, however, will best be understood when described in connection with the accompanying drawings, in which.

Figure 1:
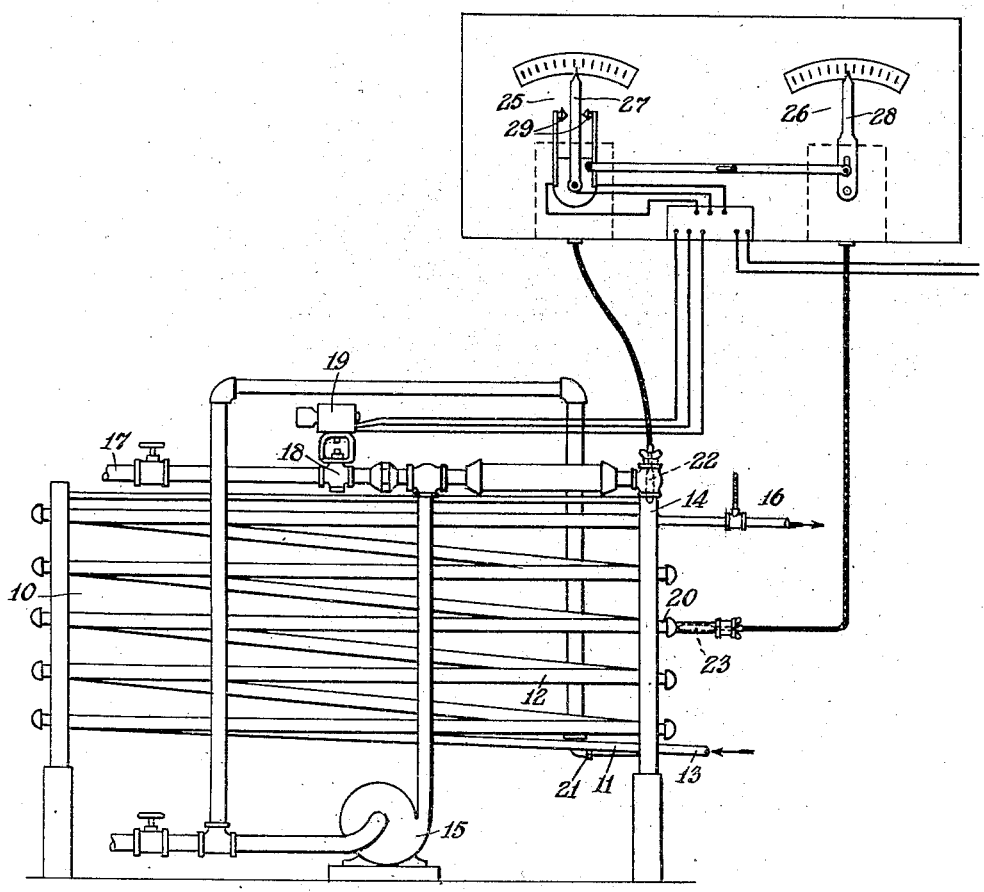
Fig. 1 illustrates more or less diagrammatically an installation for heating, to a substantially constant temperature, milk delivered from a heat-exchange device and supplied thereto in varying amounts and at different temperatures, and dual controller means operative to this end.

Referring to the drawings, 10 designates a heat interchange apparatus embodying generally headers and coaxial tubular members through one of which a heating liquid is designed to be circulated in a direction opposite to the flow of a liquid medium to be heated. In the present embodiment, for example, milk is caused to be circulated through the inner coil 11 while the heating liquid is circulated in the opposite direction through a surrounding coil 12, the inlet of the milk being at 13 and the inlet of the water substantially at the header 14. Water or other heating liquid is circulated in a substantially constant flow through the system as by means of the pump 15 and the milk is delivered to suitable storage tanks (not shown) or distributed from the apparatus at the outlet 16 after having been acted upon by the heating liquid to attain the desired outlet temperature.

Suitable means of any well known or special design are provided for introducing into the header 14 a heating medium to maintain the required temperature of the heating liquid necessary to heat the milk to a degree to cause it to attain the desired predetermined outlet temperature. For example, steam may be introduced from the main 17 through an automatically controlled valve 18 operable, for example, under regulation of an electric motor 19. The arrangement is such, and as is well understood, that the heating medium will be supplied in accordance with control apparatus under the influence of a pair of the thermo-sensitive elements.

In accordance with the present invention, these elements are both located in the heating liquid conduit 12, the one substantially at the inlet or header portion 14 thereof and the other at a point appreciably removed therefrom, for example, at the intermediate point 20 although it is to be understood that the same may be located at any point up to the outlet 21 of the conduit.

For example, a thermo-sensitive element 22 is located at the entrance to the header 14 and a thermo-sensitive element 23 at the intermediate point 20 of conduit 12, the said elements being of any well-known or special type such as the vapor or expansible liquid elements or thermoelectric couples.

In Fig. 1 of the drawings, these thermo-sensitive elements are shown as connected to controller apparatus and of the nature more particularly set forth in the aforesaid U. S. Patent #1,750,001. This mechanism is of the so-called "dual" operating type and embodies meters 25 and 26, respectively, including the indicator arms 27 and 28 actuated in well known manner by variations in the temperatures to which the said thermo-sensitive elements are exposed. The former meter also embodies contacts 29 whose position is adjusted with reference to the indicator and contact-making arm 27 through movement of the arm 28 of the other meter and to which it is linked, all of which is more fully set forth in the said Letters Patent. These means are thus controlled jointly by the thermo-sensitive elements for regulating the supply of heating medium to the heating liquid, the control and regulation in the present instance, however, resulting solely from variations of temperature of the heating liquid at different portions of the conduit through which it flows. Other well known or special means responsive to the joint effects of the thermo-sensitive elements may, of course, be utilized for this purpose.

Figure 2:
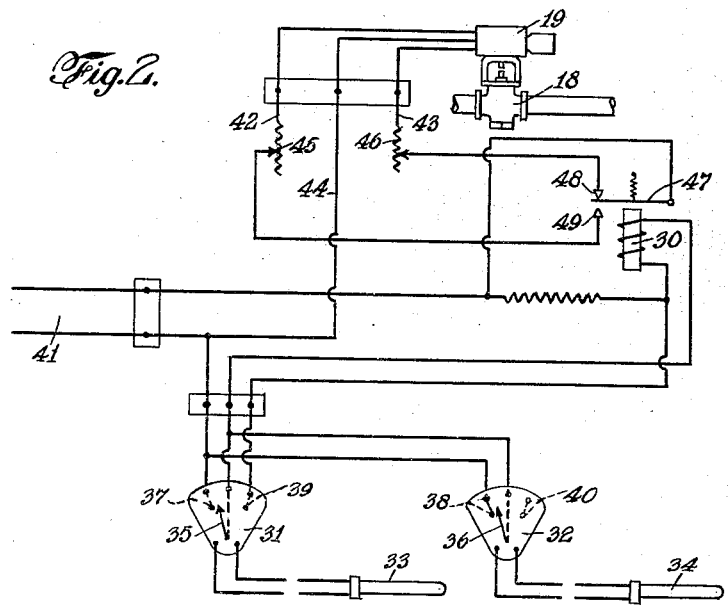
Fig. 2 is a diagrammatic view illustrating a modification in the controller arrangement.
Figure 3:
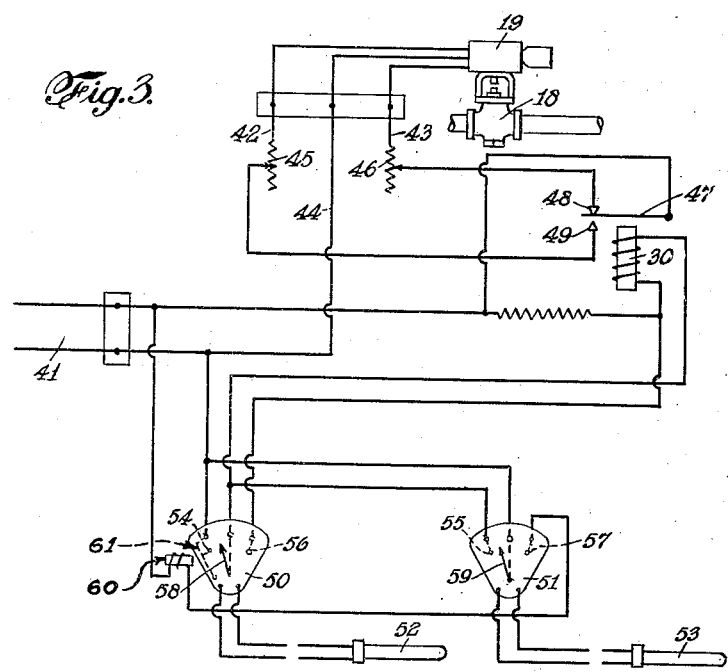
Fig. 3 is a similar view illustrating a further modification.

In Figs. 2 and 3, the control of motor 19 for regulation of valve 18 is through a relay 30 and which is independently influenced by two contact devices 31 and 32, respectively, and actuated, for example, from the thermoelectric couples 33 and 34. These devices embody, respectively, movable contact-making arms 35, 36 and low contacts 37 and 38 and high contacts 39 and 40. The relay, in controlling the motor, operates to energize from the mains 41 one or the other of two leads 42 and 43 to the motor which has also a common lead 44 connected to the mains.

Suitable resistances 45 and 46 are included in the leads 42 and 43, respectively, for regulating the motor to the desired speed of operation. The relay for controlling the motor operation is provided with a spring-drawn armature 47 which, when the relay solenoid is not energized, serves to close the circuit to the motor through lead 43 at contact 48 of the relay, while when the solenoid is energized this armature will be drawn toward the solenoid to close the circuit to the other lead 42 at the contact 49. When the said motor is energized through the latter lead, it operates to open the valve and when energized through the other lead 43, to close said valve, all of which is well understood and forms no particular part of the present invention.

By following the circuit connections, it will readily be seen that if either arm 35 or 36 engages its corresponding low contact 37 or 38, relay 30 will be energized to close thereby the circuit at contact 49 for energizing the motor through lead 42 and effecting opening of the valve. This valve will remain open then notwithstanding departure of the arm 35 from engagement with its corresponding aforesaid contact 37, it being understood that the motor operated valve is provided with the usual well-known limit devices. However, if the temperature of the water, as reflected by the thermo-sensitive element 34, rises to a point which indicates a too high temperature of the outgoing milk, arm 36 will also leave its contact 38 and break the circuit to the relay 30, causing armature 47 to make the motor circuit at contact 48 for closing the valve, or reducing the supply of heating medium.

When the temperature of the heating liquid at the inlet, as reflected by the response of the thermo-sensitive element 33, rises to a point sufficient for arm 35 to engage the contact 39, the solenoid of relay 30 will be short-circuited to release armature 47, for closing of the valve 18, in case said armature should not have previously been released by departure of both arms from their respective low contacts.

In Fig. 3, a similar arrangement is shown, with contact devices 50 and 51 controlled by the thermoelectric couples 52 and 53, respectively. These devices are provided with low contacts 54 and 55, respectively, and also with high contacts 56 and 57, adapted to be engaged by respective contact-making arms 58 and 59. The operation so far as contacts 54, 55 and 56 are concerned, is precisely as in the case of the arrangement hereinbefore described in connection with Fig. 2. However, when arm 59 engages the contact 57, provision is made for displacing thereby the contact 54 to bring the same to a lower control temperature. For example, in the closing of the circuit at the contact 57, an electromagnet 60 may be energized to attract an armature 61 carrying the said contact 54.

By this expedient, a new control point (for a lower temperature) is provided automatically to meet a condition such as would result from a reduced load. Upon return of normal conditions, however, the circuit will be interrupted at the high contact 57 and the former low point contact 54 will be restored to its original position and prevail in the control of the relay.

I claim:

1. In an apparatus of the class described and comprising a conduit for heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet thereof and both subject to the temperature of the liquid flowing therethrough; and means controlled by said thermo-sensitive elements whereby the heating action of the heating liquid is controlled solely by variations of temperature of said heating liquid at different portions of the conduit.

2. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet thereof and both subject to the temperature of the liquid flowing therethrough; and means controlled jointly by said thermo-sensitive elements whereby the heating action of the heating liquid is controlled solely by variations of temperature of said heating liquid at different portions of the conduit.

3. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium is discharged from said medium conduit, said means comprising a pair of thermosensitive elements located in the heating liquid conduit, the one substantially at the inlet thereof and both subject to the temperature of the liquid flowing therethrough; controller means responsive to the thermo-sensitive elements; and means regulated by said controller means for introducing a heating medium to the heating liquid supplied to the liquid conduit.

4. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet thereof and both subject to the temperature of the liquid flowing therethrough; controller means responsive to the thermo-sensitive elements, and embodying actuating means operated by one of the thermo-sensitive elements and set by the other; and means regulated by said controller means for introducing a heating medium to the heating liquid supplied to the liquid conduit.

5. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet to the heating liquid conduit and the other at a point appreciably removed therefrom and both being subject to the temperature of the liquid flowing therethrough; controller means responsive to the thermo-sensitive elements; and means regulated by said controller means for introducing a heating medium to the heating liquid supplied to the liquid conduit.

6. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet to the heating liquid conduit and the other at a point intermediate the inlet and outlet thereof and both being subject to the temperature of the liquid flowing therethrough; controller means responsive to the thermo-sensitive elements; and means regulated by said controller means for introducing a heating medium to the heating liquid supplied to the liquid conduit.

7. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet thereof and both subject to the temperature of the liquid flowing therethrough; controller means responsive to the thermo-sensitive elements and including two independently operating contact means actuated by the respective thermo-sensitive elements; means for introducing a heating medium to the liquid supplied to the heating liquid conduit; and an electric motor regulating said medium-introducing means, and controlled through the said independently operating contact means, each of said contact means embodying a contact remaining closed for different predetermined low temperatures to which their thermo-sensitive elements are exposed and one of said independently operating contact means embodying a further contact adapted to be closed at a predetermined temperature to which its thermo-sensitive means is exposed and above the higher of the said two predetermined low temperatures.

8. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet thereof and both subject to the temperature of the liquid flowing therethrough; controller means responsive to the thermo-sensitive elements and including two independently operating contact means actuated by the respective thermo-sensitive elements; means for introducing a heating medium to the liquid supplied to the heating liquid conduit; and an electric motor regulating said medium-introducing means, and controlled through the said independently operating contact means, each of said contact means embodying a low and a high contact, and the high contact of one of the devices closing in accordance with the rate of flow and/or initial temperature of the liquid medium to effect a change in the control position of the low contact of the other device.

9. In an apparatus of the class described and comprising a conduit for a heating liquid having a fixed rate of flow therethrough, a conduit for medium in heat-exchange relation thereto and variable in volume as well as temperature: means for maintaining automatically a determinable normal outlet temperature of the medium as discharged from said medium conduit, said means comprising a pair of thermo-sensitive elements located in the heating liquid conduit, the one substantially at the inlet thereof and both subject to the temperature of the liquid flowing therethrough; controller means responsive to the thermo-sensitive elements and including two independently operating contact means actuated by the respective thermo-sensitive elements; means for introducing a heating medium to the liquid supplied to the heating liquid conduit; and an electric motor regulating said medium-introducing means, and controlled through the said independently operating contact means, each of said contact means embodying a contact remaining closed for different predetermined low temperatures to which the corresponding thermo-sensitive element is exposed and further contacts adapted to be closed at predetermined temperatures to which the corresponding thermo-sensitive means is exposed and above the aforesaid low temperatures, the contact of higher temperature of one of the contact means when energized effecting an adjustment of the lower contact of the other of said contact means.

In testimony whereof I affix my signature.

FRED A. FAUST.